United States Patent
Fletcher et al.

[11] 3,815,969
[45] June 11, 1974

[54] HOLOGRAPHY UTILIZING SURFACE PLASMON RESONANCES

[76] Inventors: James C. Fletcher, Administrator of the National Aeronautics and Space Administration, in respect to an invention by; James J. Cowan, Huntsville, Ala.

[22] Filed: May 31, 1973

[21] Appl. No.: 365,644

[52] U.S. Cl. ........................ 350/3.5, 96/38.3, 96/79
[51] Int. Cl. ........................ G02b 27/00, G03c 1/72
[58] Field of Search ......... 350/3.5, 162 SF; 96/38.3, 96/79, 81

[56] References Cited
UNITED STATES PATENTS

| | | | |
|---|---|---|---|
| 3,623,798 | 11/1971 | Sheridon | 350/3.5 |
| 3,743,507 | 7/1973 | Ih et al. | 350/3.5 |

*Primary Examiner*—Ronald J. Stern
*Attorney, Agent, or Firm*—L. D. Wofford, Jr.; G. J. Porter; J. R. Manning

[57] ABSTRACT

A holographic recording medium employing a substrate having a diffraction grating composed of a plurality of spaced line ridges on a surface thereof together with a first layer consisting of a metal having a plasma wavelength shorter than that of a selected light source and a second layer, or coating, on top of the first layer, consisting of a thin film of photo-sensitive emulsion.

5 Claims, 4 Drawing Figures

PATENTED JUN 11 1974 3,815,969

HOLOGRAPHY UTILIZING SURFACE PLASMON RESONANCES

ORIGIN OF THE INVENTION

The invention described herein was made in the performance of work under a NASA contract and is subject to the provisions of Sec. 305 of the National Aeronautics and Space Act of 1958, Public Law 85-568 (72 STAT. 435;42 U.S.C. 2457).

BACKGROUND OF THE INVENTION

1. Field of the Invention

This invention relates to the process of production and reconstruction of holograms and particularly to an improved medium for the production of holograms utilizing the propagation of a surface wave in a layer of photographic emulsion on a diffraction grating.

2. General Description of the Prior Art

Holography, a lens-less form of photography, is based upon the recording on a photographic film or plate of a diffraction pattern created by the interference between light scattered from an object or scene that has been illuminated with coherent light and light directly impingent upon the film from the same light source. Generally the interference occurs in free space. In certain special cases bound or surface waves within some medium other than free space have been used as either the reference or object beam. Heretofore, however, the use of bound or surface waves within a layer of photographic emulsion has not been satisfactory. One, this has required that the emulsion be coated with a transparent material of higher index of refraction than that of the emulsion itself, and two, the object or reference light must pass through this coating. The result is that either the object light or reference light must be incident at excessively large incident angles in order to stimulate surface waves. Further, such methods do not achieve surface plasmon resonances as contemplated by this invention nor do they enable the intensity of surface waves to be sufficiently controlled.

SUMMARY OF THE INVENTION

Accordingly, it is the object of this invention to provide an apparatus and arrangement for making holograms wherein an improved used is made of surface plasma waves.

In accordance with the invention, a reflection type diffraction grating is constructed in which the grating surface consists of a metal having a plasma wave length which lies at a shorter wave length than the spectral region of the light which is to be used with the system. The plasma frequency, $\omega_p$, is defined as $$\omega_p = \sqrt{(4\pi n e^2)/m},$$

where $e$ = electron charge, $n$ = conduction electron density, and $m$ = effective electron mass of the metal. The plasma wavelength, $\lambda_p$, is defined in terms of the speed of light, $c$, and $\omega_p$ by $$\lambda_p = 2\pi c/\omega_p.$$

These definitions apply to an idealized free-electron-like metal, but give very good values for a metal like aluminum. Modifications to the formula are necessary for non-ideal metals, such as gold or silver. Over the metal surface is applied a photographic emulsion. A hologram is recorded by directing conventional image and reference beams on the surface of the photographic emulsion, with the object beam being typically directed nearly normal to the sensitized surface and the reference beam directed at a smaller, selected, angle to the surface. The light is plane-polarized light from a continuous source of coherent light. There results a second reference beam or surface wave which passes across the grating in the photographic emulsion just under the surface, and as a result of the configuration described, plasmon resonances appear. The optimum angle of incidence of the reference beam is achieved when off-blaze images become dark only in certain patches, those corresponding to the dielectric thickness, at which the plasmon resonance has its maximum intensity.

DESCRIPTION OF THE PREFERRED EMBODIMENT

Figure 1:
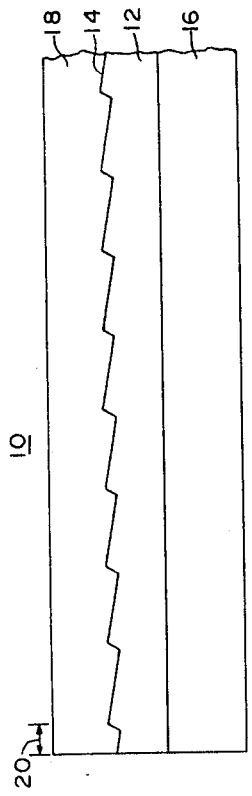
FIG. 1 is an edge view of a portion of a holographic recording structure constructed in accordance with the invention.

Referring to FIG. 1, holographic recording device 10 utilizes a construction in which a layer 12 of a selected metal is formed to provide a grating surface 14, the selected metal having a plasma wavelength which lies at a shorter wave length than the spectral region of the light which is to be employed in making holograms. If the metal layer is thin, i.e., a few hundred angstroms, it may be supported by a flat glass, quartz, or similar type of substrate 16. The grating surface 14 should have sharp, rather than rounded ridges so that efficient stimulation of the surface waves can occur.

As examples of metals for the grating surface, in the visible spectrum region, aluminum or silver may be employed. To the metal grating is applied a thin layer of high resolution recording emulsion 18 with a sufficiently low absorption coefficient so that incident light will not be appreciably absorbed before being reflected by metal grating surface 14. The layer of emulsion has a thickness on the order of one micron and preferably only a few hundred angstrom units. A photosensitive emulsion such as AgfaGevaert 10E56 has been satisfactorily employed as the recording medium. The emulsion may be applied by heating it until it is in a liquid form and in turn heating the grating and thereafter applying the emulsion to grating surface 14. A thin layer is achieved by simply turning substrate on its side and allowing a portion of the emulsion to run off. There is left a thin layer of emulsion which adheres to the surface and hardens.

Figure 2:
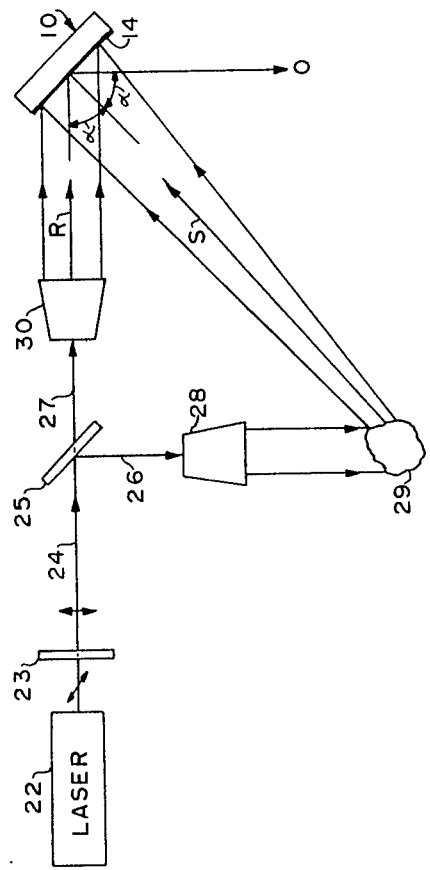
FIG. 2 is a schematic, plan oriented, illustration of one possible holographic system constructed in accordance with the invention.

An optical system for making holograms is illustrated in FIG. 2. Typically, a hologram would be made by first masking all but a top edge region 20 of grating surface 14 (FIG. 1). This top edge is then exposed to laser light, e.g., plane-polarized 5145 angstrom light from argon laser 22. In most cases the polarization plane of a laser beam is vertical, or S-polarized, but this plane may be rotated by 90 degrees to the horizontal plane by passing the laser beam through a half-wave plate, plate 23 as shown, and a horizontal, or P-polarized plane beam 24, obtained. In the present case, this horizontal plane is the plane corresponding to the plane in which the angle of incidence on grating surface 14 is measured.

Beam 24 is directed onto beam splitter 25. From it there is formed two beams, beams 26 and 27. Beam 26 is expanded to sufficient working size and spatially filtered by beam expander 28 to cover object 29 upon which it is directed. The resulting reflected beam, beam S from object 29, passes on to recording device 10, arriving essentially normal to grating surface 14. The other beam, referenced beam R, passes through beam splitter 25, then through beam expander 30 where this beam is also spatially filtered, and then finally onto grating surface 14 at an angle $\alpha$. This produces a surface reference wave in emulsion 18 which, stimulated by rotating recording device 10, varying angle $\alpha$; until the surface wave corresponds to the $-1$ diffracted order, (FIG. 3), and passes off, as shown, parallel to surface 14. A slight further rotation, stimulates the surface wave which is indicated when the off blaze orders $+1$ and $+2$ become quite dark. When the critical angular position has been thus determined, the principal surface of grating surface 12 may be unmasked and holograms made in the usual way.

Figure 3:
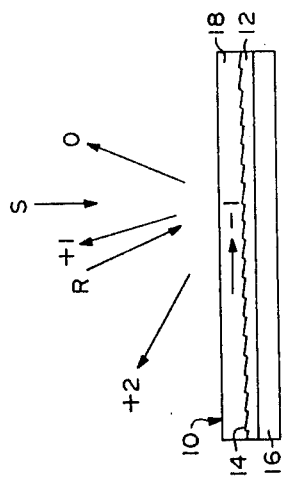
FIG. 3 is a schematic illustration showing the light patterns involved in the construction of a holographic image.

FIG. 3 illustrates the process of construction of a holographic image. Reference beam R is shown as being incident on grating surface 14 and diffracted into the propagating orders, 0, +1, and +2 and surface wave $-1$. A hologram is formed when surface wave $-1$ interferes coherently with object beam or light S.

After an appropriate exposure, the whole grating is immersed in a photographic developer, stop bath, and fixer, in that order, and recording device 10 is then dried. With the photographic process thus completed and the hologram thus recorded, the image may thereafter be reconstructed when desired.

In order to reconstruct the recorded image, the grating is placed in the same position in the optical system as when the hologram was recorded. Light from the object beam is blocked off and reconstruction is made with reference beam R alone. In case the emulsion layer has shrunk or its thicknesses changed slightly, the incident angle of the reconstruction beam may be slightly different from the angle of construction. This may be determined experimentally by looking at the off-blaze images and rotating recording device 10 about its center until these images become dark; that is until the same small areas of equal thickness that got dark in construction are made dark in reconstruction. Properly oriented, the result is that there may be observed a bright reproduced image of the photographed object when viewed at a critical angle.

Figure 4:
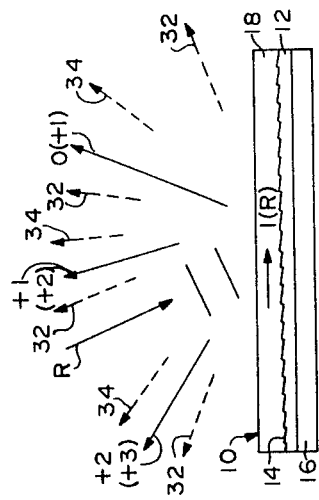
FIG. 4 is a schematic illustration showing the light patterns involved in the reconstruction of a holographic image.

Upon reconstruction as illustrated in FIG. 4, the 1(R) surface wave can be regarded as a new reference beam, which in turn is diffracted into its own propagating orders (+1), (+2), and (+3). Dashed lines 32 denote real holographic images and dashed lines 34 represent conjugate or imaginary (virtual) images.

While the process thus far described is for an absorption type hologram, it is also possible to make a phase-type hologram simply by bleaching the emulsion using standard bleaching techniques. The invention has a particular advantage over previous methods and devices for surface wave holography in that the reference or object light can be made to successfully pass directly from air to the emulsion layer and be incident at small as well as large angles of incidence. Further, construction can be made at one angle using certain order diffracted light, for example, as the reference beam, and reconstruction be made at a different angle, using a different order diffracted light. In addition, the invention enables holograms to be made using surface plasma waves of narrow resonances and wherein the intensity distribution can be controlled by using gratings of different line spacing and blaze angles and wherein surface waves can be stimulated at large or small angles in very thin recording layers by light that passes directly from air into the recording medium.

What is claimed is:

1. A holographic device for recording holographic images comprising:
   a substrate having a surface thereof formed of a plurality of spaced lined ridge disposed to provide a predetermined diffraction grating on said surface;

a metal comprising said surface; and
   a coating of photosensitive emulsion on said surface.

2. A holographic device as set forth in claim 1 wherein said metal comprises said substrate.

3. A holographic device for recording holographic images as set forth in claim 1 further comprising:
   means for generating a beam of coherent light;
   positioning means for positioning an object to be photographed in a selected position with respect to said surface of said substrate;
   means for splitting said beam of coherent light and directing one portion of said beam onto a said object and then onto said surface of said substrate and directing a second portion of said beam, being a reference portion, onto said surface at a selected angle of incidence;
   whereby a further and second reference beam is generated in said coating which propagates across the surface of said diffraction grating creating a plasmon resonance in said coating.

4. A holographic device as set forth in claim 3 wherein said device includes means for polarizing said reference portion of said beam in a plane, which plane is oriented with respect to said surface at an angle corresponding to the plane in which said selected angle of incidence is measured.

5. A holographic device as set forth in claim 4 wherein said metal has a shorter plasma wave length characteristic than coherent light generated by said means for generating a beam of coherent light.

* * * * *